G. W. ESTERLY & J. VAN DE WATER.
Improvement in Cultivators.
No. 131,861.  Patented Oct. 1, 1872.
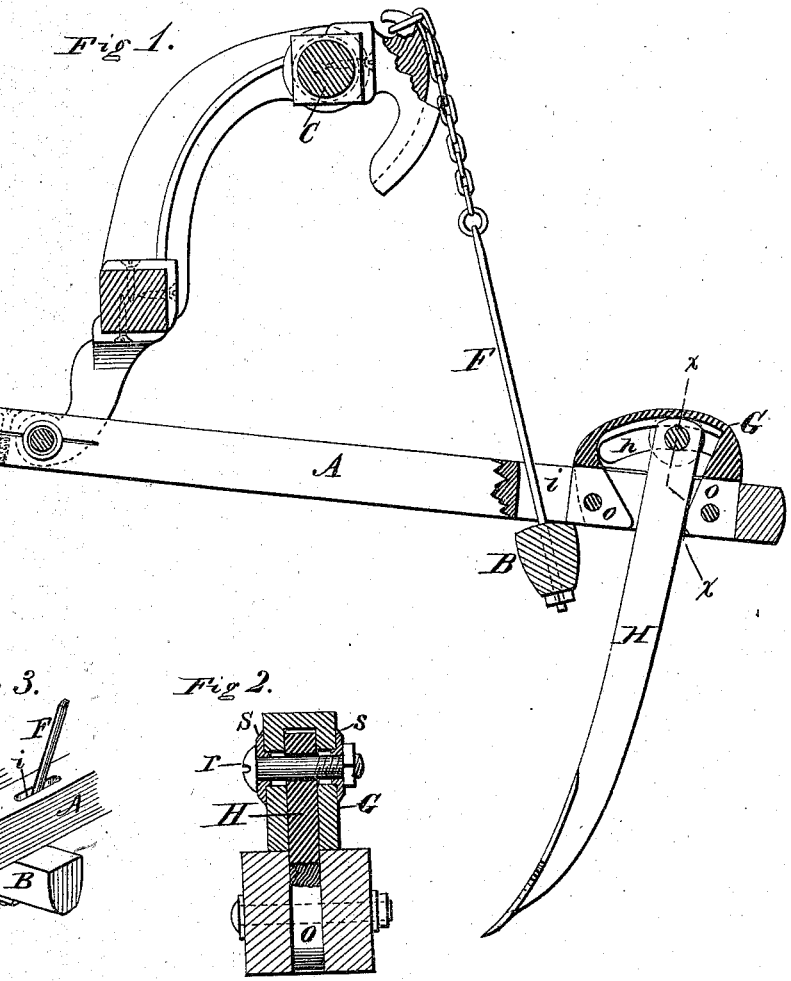

UNITED STATES PATENT OFFICE.

GEORGE W. ESTERLY AND JOSEPH VAN DE WATER, OF WHITEWATER, WISCONSIN.

IMPROVEMENT IN CULTIVATORS.

Specification forming part of Letters Patent No. 131,861, dated October 1, 1872.

*To all whom it may concern:*

Be it known that we, GEORGE W. ESTERLY and JOSEPH VAN DE WATER, of Whitewater, in the county of Walworth and State of Wisconsin, have invented certain Improvements in Seeding-Machines and Cultivators, of which the following is a specification, reference being had to the accompanying drawing.

The first part of our invention relates to that class of machines employing a series of drag-bars, in which the drag-bars are raised by means of a lifting-bar arranged transversely under them; and it consists in a novel manner of arranging the lifting-bar, so that it cannot move endwise or sidewise. The second part of our invention consists in a metal head or friction-block for attaching the shovel standards to the drag-bars, which permits the standard to yield when the shovel meets an obstruction, and enables the operator to fasten the standard at any required inclination.

Figure 1 is a longitudinal vertical section of a portion of a seeding-machine having our improvements therein; Fig. 2, a vertical cross-section on the line $x\,x$ of Fig. 1, showing the construction of the head for holding the standard; Fig. 3, a perspective view, showing the arrangement of the lifting-bar.

In the drawing, A represents the drag-bars; B, the lifting-bar arranged under the drag-bars; and C, the cross-shaft or roller from which the lifting-bar is suspended. The general arrangement of these parts is the same as in the machines now in general use, and therefore forms no part of our invention. Heretofore the lifting-bar has been suspended in such a manner that it was necessary to provide it with end fastenings to prevent it from swinging about and catching in the wheels, striking the standards, &c. To dispense with these fastenings and provide a cheaper and simpler means for holding the bar in place is the object of the first part of our invention. This we accomplish by making the suspending-chains D quite short, and attaching to their lower ends rods F, and then passing each rod down through one of the drag-bars and securing the ends of the rods firmly to the lifting-bar, as shown. The drag-bars being arranged in the usual manner, so that they cannot swing laterally, serve to hold the rods from moving, and thus to prevent the lifting-bar from moving out of place either endwise or sidewise. Slots $i$ are made in the proper drag-bars for the rods F to pass through, as shown, so as to leave the drag-bars free to rise and fall, the slots being made as short as possible, so as to prevent the rods from playing. The lifting-bar may be placed in front of or behind the shovel-standards, but it is preferred to place it in front and have it bear against them. The rods may be passed through the lifting-bar, and have nuts applied to their ends, as shown, or they may be attached in any other suitable manner. One advantage using the nuts is that they may be adjusted so as to hold the lifting-bar at any desired point on the rods. The second part of our invention relates to the metal head or friction-block for holding the shovel-standard. This head consists of a metal body, G, to rest on top of the drag-bar, provided at its ends with two depending lugs, $o$, to fit down into a mortise in the bar. The space between the lower ends of the two lugs is just sufficient to admit the upper end of the standard, which is passed up between them, as shown, so that they bear against its front and rear edges and form a fulcrum for it, as shown in Fig. 1. The upper portion of the body G is provided in its interior with a longitudinal slot or opening to receive the upper end of the standard, so that it can swing forward and back therein. Two curved slots $h$ are made through the sides of the body G opposite to each other, and a bolt, $r$, passed through the slots and the upper end of the standard, and provided on its ends with washers $s$, bearing against the sides of the body, as shown in Fig. 2, so that when the bolt is tightened up it clamps the washers fast, so that they hold the bolt and thereby the end of the standard. When, however, the standard receives a violent strain its upper end overcomes the friction of the washers $s$ and pushes the bolt forward in the slots, as its lower end, with the shovel, swings backward. By adjusting the bolt so as to properly regulate the friction of the washers the standard may be allowed to yield at any given strain desired. By moving the bolt in the slots the standard may be set in any required position. The head may be secured to the drag-bar by passing bolts through its lugs or arms, as shown, or in any other suitable manner; and it may be cast in one piece or in two pieces and bolted together.

Having thus described our invention, what we claim is—

1. The lifting-bar B, having the rods F attached, said rods passing up through slots or their equivalents in the drag-bars A, and connected by chains or cords to the rock-shaft C, whereby the drag-bars can all be raised together and each be free to rise and fall independently, and the lifting-bar be held in its place, substantially as described.

2. The mortised or hollow block G, provided with the curved slot and the shoulders or projections O, in combination with the shank H, bolt $r$, and drag-bar A, all constructed and arranged to operate as shown and described.

GEO. W. ESTERLY.
JOSEPH VAN DE WATER.

Witnesses:
E. P. BURROWS,
IRA PEARSON.